United States Patent
Cao et al.

(10) Patent No.: US 11,100,167 B2
(45) Date of Patent: Aug. 24, 2021

(54) OBTAINING DYNAMIC EMBEDDING VECTORS OF NODES IN RELATIONSHIP GRAPHS

(71) Applicant: Advanced New Technologies Co., Ltd., George Town (KY)

(72) Inventors: Shaosheng Cao, Hangzhou (CN); Qing Cui, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/809,219

(22) Filed: Mar. 4, 2020

(65) Prior Publication Data

US 2020/0356598 A1 Nov. 12, 2020

Related U.S. Application Data

(63) Continuation of application No. PCT/CN2020/071704, filed on Jan. 13, 2020.

(30) Foreign Application Priority Data

May 6, 2019 (CN) .......................... 201910372931.7

(51) Int. Cl.
*G06F 17/00* (2019.01)
*G06F 16/901* (2019.01)
(Continued)

(52) U.S. Cl.
CPC .......... *G06F 16/9024* (2019.01); *G06F 17/16* (2013.01); *G06N 20/00* (2019.01)

(58) Field of Classification Search
CPC .. G06F 16/9024; G06F 16/9027; G06F 17/16; G06F 7/78; G06F 17/10; G06F 7/544; G06F 1/03; G06N 20/00
See application file for complete search history.

(56) References Cited

U.S. PATENT DOCUMENTS

2017/0337481 A1 11/2017 Trouillon et al.
2018/0157644 A1\* 6/2018 Mandt .................... G06F 40/30
(Continued)

FOREIGN PATENT DOCUMENTS

CN 107145977 9/2017
CN 108090607 5/2018
(Continued)

OTHER PUBLICATIONS

E. Faerman, F. Borutta, K. Fountoulakis and M. W. Mahoney, "LASAGNE: Locality and Structure Aware Graph Node Embedding," 2018 IEEE/WIC/ACM International Conference on Web Intelligence (WI), Santiago, pp. 246-253, December (Year: 2018).\*
(Continued)

*Primary Examiner* — Greta L Robinson
(74) *Attorney, Agent, or Firm* — Fish & Richardson P.C.

(57) ABSTRACT

Implementations of this disclosure provide for obtaining dynamic embedding vectors of nodes in relationship graphs. An example method includes determining N neighboring nodes of a first node of a plurality of nodes; obtaining respective input embedding vectors of the first node and the N neighboring nodes, the input embedding vector of each node being determined based on a respective static embedding vector and a respective positional embedding vector of the node; inputting the respective input embedding vectors of the first node and the N neighboring nodes into a pre-trained embedding model that includes one or more sequentially connected computing blocks, each computing block including a corresponding self-attention layer that outputs N+1 output vectors corresponding to N+1 input vectors; and receiving respective dynamic embedding vectors of the first node and the N neighboring nodes output by the pre-trained embedding model.

17 Claims, 10 Drawing Sheets

(51) Int. Cl.
*G06F 17/16* (2006.01)
*G06N 20/00* (2019.01)

(56) References Cited

U.S. PATENT DOCUMENTS

| | | | | |
|---|---|---|---|---|
| 2018/0341720 | A1* | 11/2018 | Bhatia | G06N 5/003 |
| 2019/0114362 | A1* | 4/2019 | Subbian | G06F 16/24578 |
| 2019/0130273 | A1 | 5/2019 | Keskar et al. | |
| 2019/0286754 | A1* | 9/2019 | Leskovec | G06F 16/182 |
| 2019/0392082 | A1* | 12/2019 | Bell | G06F 16/24578 |

FOREIGN PATENT DOCUMENTS

| | | |
|---|---|---|
| CN | 108256678 | 7/2018 |
| CN | 108737491 | 11/2018 |
| CN | 108763567 | 11/2018 |
| CN | 108985309 | 12/2018 |
| CN | 109194707 | 1/2019 |
| CN | 109242633 | 1/2019 |
| CN | 109492227 | 3/2019 |
| CN | 109543722 | 3/2019 |
| CN | 109635947 | 4/2019 |
| CN | 110245269 | 9/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071704, dated Mar. 31, 2020, 19 pages (with machine translation).

Arxiv.org [online], "A Structured Self-Attentive Sentence Embedding," Dec. 2017, retrieved on Apr. 15, 2021, retrieved from URL<https://arxiv.org/pdf/1703.03130.pdf>, 15 pages.

* cited by examiner

| Node | A | B | C | D | E |
|---|---|---|---|---|---|
| Input embedding vector | ☐☐☐☐ = E_A | ☐☐☐☐ = E_B | ☐☐☐☐ = E_C | ☐☐☐☐ = E_D | ☐☐☐☐ = E_E |
| Static embedding vector | ☐☐☐☐ + E_A | ☐☐☐☐ + E_B | ☐☐☐☐ + E_C | ☐☐☐☐ + E_D | ☐☐☐☐ + E_E |
| Positional embedding vector | ☐☐☐☐ E_0 | ☐☐☐☐ E_1 | ☐☐☐☐ E_1 | ☐☐☐☐ E_2 | ☐☐☐☐ E_2 |

OBTAINING DYNAMIC EMBEDDING VECTORS OF NODES IN RELATIONSHIP GRAPHS

CROSS-REFERENCE TO RELATED APPLICATIONS

This application is a continuation of PCT Application No. PCT/CN2020/071704, filed on Jan. 13, 2020, which claims priority to Chinese Patent Application No. 201910372931.7, filed on May 6, 2019, and each application is hereby incorporated by reference in its entirety.

TECHNICAL FIELD

Implementations of the present disclosure relate to the field of graph computing technologies, and more specifically, to methods and devices for obtaining dynamic embedding vectors of nodes in relationship graphs of multiple nodes.

BACKGROUND

In the big data era, massive user relationship data can be obtained, and relationship graphs of multiple users can be constructed by using the data. For relationship graphs, generally, an embedding vector of each node in the diagram is computed by using a graph embedding algorithm, that is, each node in the relationship graphs is represented by a vector of a predetermined dimension (e.g., 100 dimensions). After the embedding vector of each node is obtained, specific features of one node can be predicted based on another node and similarity measures between embedding vectors of the nodes. For example, when similarity measures between embedding vectors of two nodes are relatively high, based on purchased products of one node of the two nodes, the products can be recommended to the other node.

Conventional graph embedding algorithms typically compute the embedding vector of each node based on an adjacency list or an adjacency matrix of the relationship graph at a certain time point (e.g., at a time point close to a current time point). However, the relationship graph itself is dynamically changing. For example, in a social relationship graph, because new friend relationships are continuously generated and existing friend relationships are defriended, a network structure at time point t1 is likely to be different from a network structure at time point t2. Therefore, dynamic information of the previous change of the network structure is not well utilized if only network structure information at one time point is used to determine the embedding vector of each node.

SUMMARY

Implementations of the present specification are intended to provide more effective solutions for obtaining a dynamic embedding vector of a node in current relationship graphs of multiple nodes to address deficiencies in the existing technology.

To achieve the previous object, an aspect of the present specification provides methods for obtaining dynamic embedding vectors of nodes in relationship graphs of multiple nodes, according to an implementation of the present specification. The multiple nodes include a first node, and the method includes: determining N neighboring nodes of the first node based on relationship graphs of the multiple nodes at a first time point, where N is a predetermined integer; obtaining respective input embedding vectors of the first node and the N neighboring nodes of the first node, where the input embedding vector of each node is determined based on a static embedding vector and a positional embedding vector of the node, the static embedding vector corresponds to attribute features of the node, and the positional embedding vector corresponds to positional features of the node relative to the first node; and inputting the respective input embedding vectors of the first node and the N neighboring nodes of the first node into a pre-trained embedding model, so the model outputs respective dynamic embedding vectors of the first node and the multiple neighboring nodes of the first node in a case that the first node is a primary node, where the embedding model includes one or more computing blocks that are sequentially connected, each computing block includes a corresponding self-attention layer, and the self-attention layer outputs, relative to N+1 input vectors based on self-attention mechanism, N+1 output vectors corresponding to the N+1 input vectors.

In an implementation, the multiple neighboring nodes are neighboring nodes within a predetermined degree of the first node.

In an implementation, the static embedding vectors are obtained based on an adjacency matrix of the relationship graphs.

In an implementation, for each node, respective values of elements of the positional embedding vector are obtained based on a degree of the node relative to the first node and a dimension of the element in the positional embedding vector.

In an implementation, the static embedding vector and the positional embedding vector are obtained by pre-training the embedding model.

In an implementation, the self-attention layer is computed based on one or more self-attention functions, and the self-attention function outputs, based on N+1 input vectors input into the self-attention layer, N+1 function output vectors respectively corresponding to the N+1 input vectors, where an ith function output vector of the N+1 function output vectors is: a weighted combination of respective first transform vectors of the N+1 input vectors by using an association degree between an ith input vector of the N+1 input vectors and each input vector as a weight, where the first transform vector is obtained by transforming a corresponding input vector by using a first weight matrix corresponding to the self-attention function, and the first weight matrix is obtained by pre-training the embedding model.

In an implementation, each input vector further includes a jth input vector, an association degree between the ith input vector and the jth input vector is determined based on similarity measures between a second transform vector of the ith input vector and a third transform vector of the jth input vector, the second transform vector is obtained by transforming a corresponding input vector by using a second weight matrix corresponding to the self-attention function, the third transform vector is obtained by transforming a corresponding input vector by using a third weight matrix corresponding to the self-attention function, and both the second weight matrix and the third weight matrix are obtained by pre-training the embedding model.

In an implementation, the multiple nodes include a second node, and the embedding model is pre-trained by using the following steps: determining N neighboring nodes of the second node based on relationship graphs of the multiple nodes at a second time point, and determining one or more third nodes, where a third node is a node selected from the second node and the N neighboring nodes of the second node; obtaining respective input embedding vectors of the second node and the N neighboring nodes of the second node, where an input embedding vector of the third node is a predetermined vector unrelated to the third node, and respective input embedding vectors of the second node and the N neighboring nodes of the second node except the one or more third nodes are determined based on a static embedding vector and a positional embedding vector of the node; and inputting the respective input embedding vectors of the second node and the N neighboring nodes of the second node into a current embedding model to optimize the embedding model based on one or more dynamic embedding vectors that are generated as outputs from the current embedding model and that correspond to the one or more third nodes.

In an implementation, optimizing the embedding model includes optimizing parameters of the embedding model and optimizing input embedding vectors and positional embedding vectors of the second node and the N neighboring nodes of the second node except the one or more third nodes.

In an implementation, the embedding model is pre-trained by performing the steps repeatedly for multiple times, where a previous circulation of the steps is performed based on relationship graphs of the multiple nodes at a time point before the second time point.

Another aspect of the present specification provides a method for pushing an object to a user, including: obtaining current relationship graphs of multiple users, where the multiple users include a first user and a second user, which are respectively corresponding to a fourth node and a fifth node in the current relationship graphs; based on the current relationship graphs and by using the method for obtaining dynamic embedding vectors, separately obtaining respective dynamic embedding vectors of the fourth node and a predetermined number of neighboring nodes of the fourth node in a case that the fourth node is a primary node, and respective dynamic embedding vectors of the fifth node and a predetermined number of neighboring nodes of the fifth node in a case that the fifth node is a primary node; determining similarity measures between the fourth node and the fifth node based on a dynamic embedding vector of each node in the two cases; and when the similarity measures are greater than a predetermined threshold, pushing an object to the second user based on an object of interest of the first user.

In an implementation, determining similarity measures between the fourth node and the fifth node based on a dynamic embedding vector of each node in the two cases includes computing the similarity measures between the fourth node and the fifth node based on similarity measures between a first dynamic embedding vector and a second dynamic embedding vector, where the first dynamic embedding vector is a dynamic embedding vector of the fourth node in a case that the fourth node is a primary node, and the second dynamic embedding vector is a dynamic embedding vector of the fifth node in a case that the fifth node is a primary node.

Another aspect of the present specification provides a device for obtaining dynamic embedding vectors of nodes in relationship graphs of multiple nodes, where the multiple nodes include a first node, and the device includes: a determining unit, configured to determine N neighboring nodes of the first node based on relationship graphs of the multiple nodes at a first time point, where N is a predetermined integer; an acquisition unit, configured to obtain respective input embedding vectors of the first node and the N neighboring nodes of the first node, where the input embedding vector of each node is determined based on a static embedding vector and a positional embedding vector of the node, the static embedding vector corresponds to attribute features of the node, and the positional embedding vector corresponds to positional features of the node relative to the first node; and an input unit, configured to input the respective input embedding vectors of the first node and the N neighboring nodes of the first node into a pre-trained embedding model, so the model outputs respective dynamic embedding vectors of first node and the multiple neighboring nodes of the first node in a case that the first node is a primary node, where the embedding model includes one or more computing blocks that are sequentially connected, each computing block includes a corresponding self-attention layer, and the self-attention layer outputs, relative to N+1 input vectors based on self-attention mechanism, N+1 output vectors corresponding to the N+1 input vectors.

In an implementation, the multiple nodes include a second node, and the embedding model is pre-trained by using the following training device; the training device includes: a determining unit, configured to determine N neighboring nodes of the second node based on relationship graphs of the multiple nodes at a second time point, and determine one or more third nodes, where the third node is a node selected from the second node and the N neighboring nodes of the second node; an acquisition unit, configured to obtain respective input embedding vectors of the second node and the N neighboring nodes of the second node, where an input embedding vector of the third node is a predetermined vector unrelated to the third node, and respective input embedding vectors of the second node and the N neighboring nodes of the second node except the one or more third nodes are determined based on a static embedding vector and a positional embedding vector of the node; and an optimization unit, configured to input the respective input embedding vectors of the second node and the N neighboring nodes of the second node into a current embedding model to optimize the embedding model based on one or more dynamic embedding vectors that are generated as outputs from the current embedding model and that correspond to the one or more third nodes.

In an implementation, the optimization unit is further configured to optimize parameters of the embedding model and optimize input embedding vectors and positional embedding vectors of the second node and the N neighboring nodes of the second node except the one or more third nodes.

In an implementation, the embedding model is pre-trained by implementing the device repeatedly for multiple times, where a previous implementation of the device is based on relationship graphs of the multiple nodes at a time point before the second time point.

Another aspect of the present specification provides a device for pushing an object to a user, including: a first acquisition unit, configured to obtain current relationship graphs of multiple users, where the multiple users include a first user and a second user, which are respectively corresponding to a fourth node and a fifth node in the current relationship graphs; a second acquisition unit, configured to: based on the current relationship graphs and by using the device for obtaining dynamic embedding vectors, separately obtain respective dynamic embedding vectors of the fourth node and a predetermined number of neighboring nodes of the fourth node in a case that the fourth node is a primary node, and respective dynamic embedding vectors of the fifth node and a predetermined number of neighboring nodes of the fifth node in a case that the fifth node is a primary node;

a determining unit, configured to determine similarity measures between the fourth node and the fifth node based on a dynamic embedding vector of each node in the two cases; and a pushing unit, configured to: when the similarity measures are greater than a predetermined threshold, push an object to the second user based on an object of interest of the first user.

In an implementation, the determining unit is further configured to compute the similarity measures between the fourth node and the fifth node based on similarity measures between a first dynamic embedding vector and a second dynamic embedding vector, where the first dynamic embedding vector is a dynamic embedding vector of the fourth node in a case that the fourth node is a primary node, and the second dynamic embedding vector is a dynamic embedding vector of the fifth node in a case that the fifth node is a primary node.

Another aspect of the present specification provides a computer readable storage medium that stores a computer program, and when the computer program is executed on a computer, the computer is caused to perform the method according to any one of the previous aspects.

Another aspect of the present specification provides a computing device, including a memory and a processor. Executable code is stored in the memory, and when executing the executable code, the processor implements the method according to any one of the previous aspects.

According to the graph node embedding solution of the implementations of the present specification, the embedding model is trained based on dynamically changed relationship graphs among multiple nodes in a period of time. In the embedding model, a dynamic embedding vector of each node is obtained in a certain context (i.e., a specific node is used as a primary node) based on self-attention mechanism, so more information is reflected in the dynamic embedding vector of each node, such as context (neighbor and position) information of a node, dynamically changed connection information between nodes, etc., thereby effectively utilizing temporal network structure information.

BRIEF DESCRIPTION OF DRAWINGS

By describing the implementations of the present specification with reference to the accompanying drawings, the implementations of the present specification can be made clearer.

DESCRIPTION OF IMPLEMENTATIONS

The following describes the implementations of the present specification with reference to the accompanying drawings.

Figure 1:
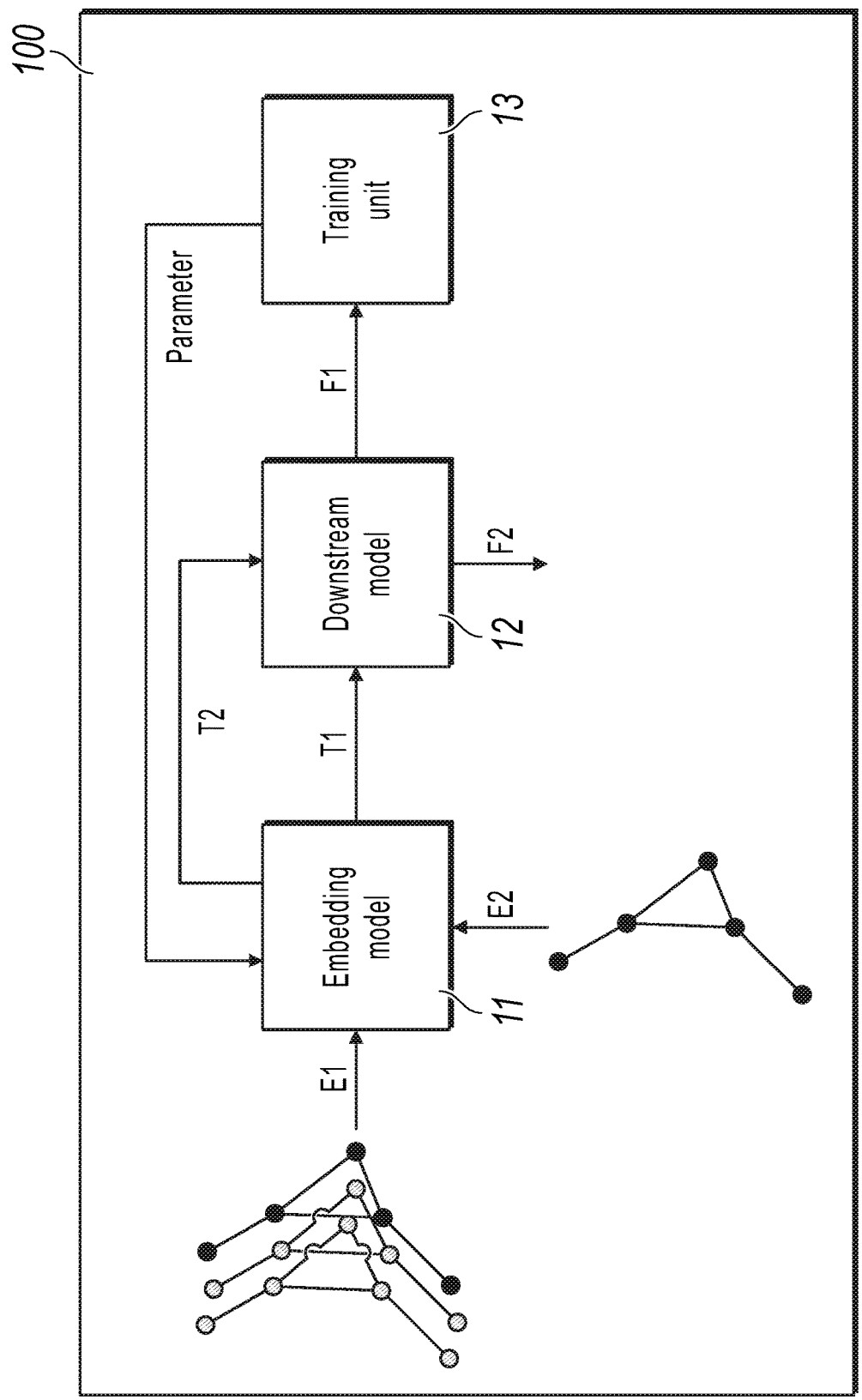
FIG. 1 is a schematic diagram illustrating an embedding system 100, according to an implementation of the present specification.

FIG. 1 is a schematic diagram illustrating an embedding system 100, according to an implementation of the present specification. As shown in FIG. 1, the system 100 includes an embedding model 11, a downstream model 12, and a training unit 13. The embedding model 11 is configured to output a dynamic embedding vector of each node based on an input embedding vector of the node. The downstream model 12 is configured to classify, regress, and predict each node based on the dynamic embedding vector output from the embedding model 11, so as to output a result corresponding to each node. The training unit 13 is configured to train the embedding model based on the result output from the downstream model 12. The embedding model includes multiple self-attention layers to compute a dynamic output vector of a particular node based on self-attention mechanism and attention of the node to each of other nodes in a model input vector.

Specifically, during training phase, by using multiple rational network diagrams among multiple nodes at different time points in a specific period of time, the training unit 13 adjusts, through multiple times of optimization, parameters of the embedding model and a static embedding vector and a positional embedding vector of each node that constitute a model input embedding vector E1, so the model reflects dynamic relationship graphs among the multiple nodes in the specific period of time. In each time of optimization, an input embedding vector E1 of each node is obtained from relationship graphs corresponding to this time of optimization and is input into the embedding model 11. The embedding model 11 outputs a dynamic embedding vector T1 of each node, and each T1 is input into the downstream model 12. The downstream model 12 outputs a prediction result F1 corresponding to each node based on each T1 and inputs the prediction result F1 into the training unit 13. The training unit 13 performs this time of model optimization based on the prediction result F1, each T1, and each E1, and returns optimized parameters to the embedding model 11.

During inference phase, a current input embedding vector E2 of each node can be obtained based on current relationship graphs among multiple nodes, and is input into the embedding model 11. The embedding model 11 outputs a dynamic embedding vector T2 of each node in each case that each node is a primary node. Therefore, the dynamic embedding vector T2 of each node can be input into the downstream model 12 to explore a prediction result F2 of each node. For example, the relationship graphs are friend relationship graphs among multiple users, multiple nodes are respectively corresponding to multiple users, and connection lines between nodes are corresponding to friend relationships between users. Therefore, when it is determined, for example by using the result F2 output by the downstream model, that two nodes are relatively similar, features of a user corresponding to one node can be determined based on features of a user corresponding to another node. For example, a purchased product of one user can be recommended to the other user.

It can be understood that the previous description of the embedding system 100 in FIG. 1 is merely an example rather than a limitation. For example, in the training model, only the model parameters can be trained, and the static embedding vector and the positional embedding vector of the node are obtained by using a predetermined algorithm. In the system 100, it is not limited to inputting the dynamic embedding vector into the downstream model. For example, similarity measures between nodes can be computed directly based on dynamic embedding vectors of the nodes, etc. In addition, the relationship graphs are not limited to the friend relationship graphs among users, but can be any other relationship graphs.

The following specifically describes the model use process and model training process.

Figure 2:
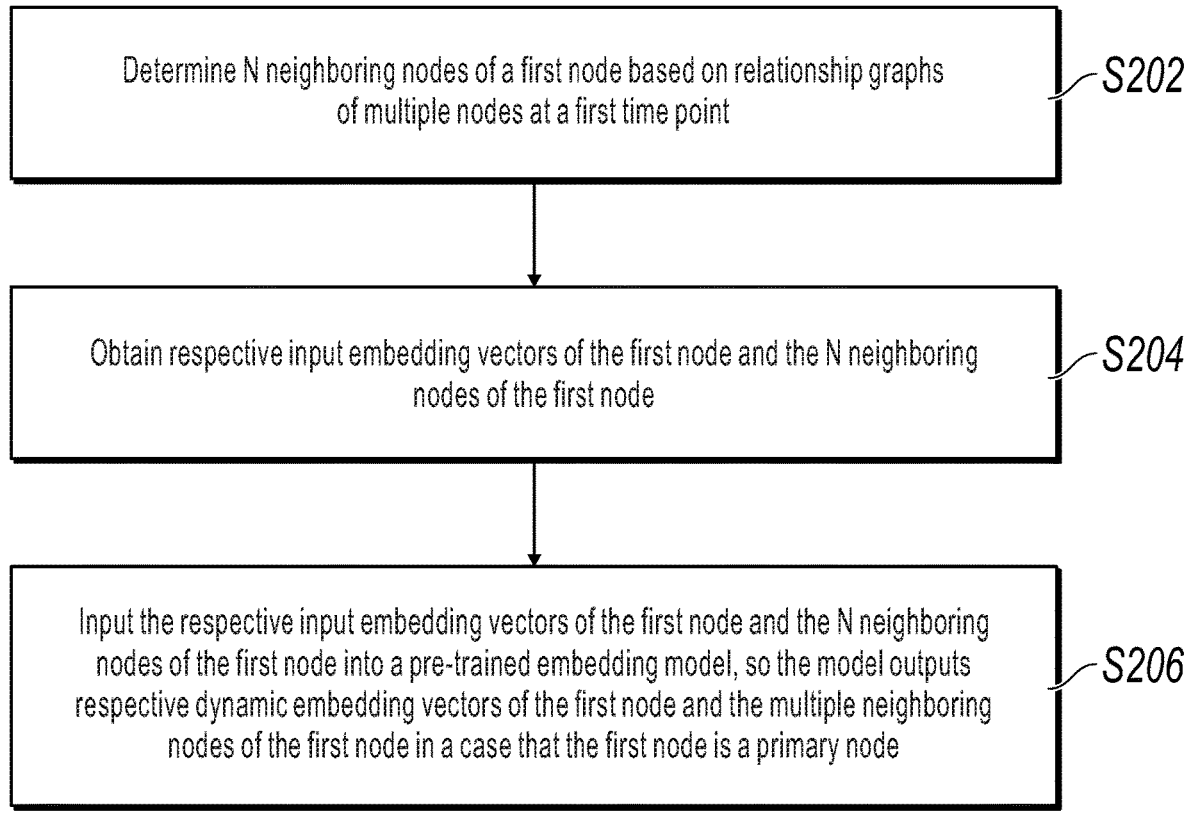
FIG. 2 illustrates a method for obtaining dynamic embedding vectors of nodes in relationship graphs of multiple nodes, according to an implementation of the present specification.

FIG. 2 illustrates a method for obtaining dynamic embedding vectors of nodes in relationship graphs of multiple nodes, according to an implementation of the present specification. The multiple nodes include a first node, and the method includes:

S202. Determine N neighboring nodes of the first node based on relationship graphs of the multiple nodes at a first time point, where N is a predetermined integer.

S204. Obtain respective input embedding vectors of the first node and the N neighboring nodes of the first node, where the input embedding vector of each node is determined based on a static embedding vector and a positional embedding vector of the node, the static embedding vector corresponds to attribute features of the node, and the positional embedding vector corresponds to positional features of the node relative to the first node.

S206. Input the respective input embedding vectors of the first node and the N neighboring nodes of the first node into a pre-trained embedding model, so the model outputs respective dynamic embedding vectors of the first node and the multiple neighboring nodes of the first node in a case that the first node is a primary node, where the embedding model includes one or more computing blocks that are sequentially connected, each computing block includes a self-attention layer, and the self-attention layer outputs, relative to N+1 input vectors based on self-attention mechanism, N+1 output vectors corresponding to the N+1 input vectors.

In this implementation of the present specification, relationship graphs among predetermined multiple nodes dynamically vary with time, and the method is used to obtain a dynamic embedding vector of a node in the relationship graphs at any time point (i.e., the first time point). For example, the relationship graphs at the first time point can be current relationship graphs of the multiple nodes.

First, at S202, N neighboring nodes of the first node are determined based on the relationship graphs of the multiple nodes at the first time point, where N is a predetermined integer.

Figures 3, 4:
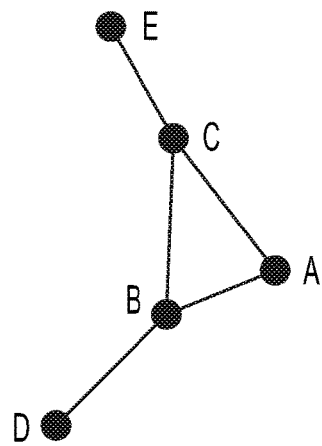
FIG. 3 is a schematic diagram illustrating relationship graphs among five nodes.
FIG. 4 is a schematic diagram illustrating respective input embedding vectors of node A and neighboring nodes of node A in the case of the relationship graph shown in FIG. 3.

FIG. 3 is a schematic diagram illustrating relationship graphs among five nodes. As shown in the figure, five nodes (nodes A, B, C, D, and E) correspond to, for example, five users (users A, B, C, D, and E). The first node can be any one of nodes A, B, C, D, and E. For example, node A is the first node, and in the method, the first node (for example, node A) is used as a primary node. Assume that N is predetermined to 4. Therefore, based on the relationship graph shown in FIG. 3, four neighboring nodes of node A can be determined: a first-degree neighboring node B, a first-degree neighboring node C, a second-degree neighboring node D, and a second-degree neighboring node E. It can be understood that for a purpose of illustration here, the relationship graph is drawn to include only five nodes. In practice, the relationship graphs can include hundreds of millions of nodes. In this case, the number of neighboring nodes of a primary node can be far greater than the predetermined number N. In this case, the N neighboring nodes of the primary node can be neighboring nodes of the node within a predetermined degree, or can be N nodes randomly determined from neighboring nodes of the node within a predetermined degree. For example, the N neighboring nodes of the primary node can be limited to first-degree neighboring nodes, second-degree neighboring nodes, and third-degree neighboring nodes of the node. Assume that a sum of numbers of the first-degree neighboring nodes, the second-degree neighboring nodes, and the third-degree neighboring nodes of the node is N. Or the N neighboring nodes of the primary node can be N nodes randomly determined from the first-degree neighboring nodes, the second-degree neighboring nodes, and the third-degree neighboring nodes of the node.

At S204, the respective input embedding vectors of the first node and the N neighboring nodes of the first node are obtained, where the input embedding vector of each node is determined based on the static embedding vector and the positional embedding vector of the node, the static embedding vector corresponds to the attribute features of the node, and the positional embedding vector corresponds to the positional features of the node relative to the first node.

FIG. 4 is a schematic diagram illustrating respective input embedding vectors of node A and neighboring nodes of node A in the case of the relationship graph shown in FIG. 3. As shown in FIG. 4, each node includes a static embedding vector and a positional embedding vector. For example, node A includes a static embedding vector $E_{\_A}$ and a positional embedding vector $E\_0$, and node B includes a static embedding vector $E_{\_B}$ and a positional embedding vector $E\_1$. The static embedding vector of the node represents a static attribute feature of the node, that is, the static embedding vector of the node is fixed relative to the relationship graphs at the first time point, and does not change with different primary nodes. In an implementation, the static embedding vector of each node at the first time point can be obtained by using an existing n2v (node-to-vector) model based on the relationship graphs at the first time point. For example, the existing n2v model can compute the static embedding vector of each node by using an adjacency matrix of the multiple nodes at the first time point. In one implementation, the static embedding vector of each node can be determined by pre-training the embedding model, which will be described in detail below. A positional embedding vector of a node reflects position information of the node relative to a primary node in the relationship graphs. The position information includes, for example, a degree of the node relative to the primary node. For example, degrees of node B and node C relative to node A are 2, and degrees of node D and node E relative to node A are 3. It can be understood that the position information is not limited to including the degree. For example, in addition to reflecting position information that node B is a second-degree neighboring node of node A, a positional embedding vector of node B can reflect position information regarding the total number of second-degree neighboring nodes of node A. In one implementation, a value of each element of a positional embedding vector of a node is obtained based on a degree of the node relative to the primary node and a dimension of the element in the positional embedding vector. For example, the value PE of each element of the positional embedding vector of the node can be computed by using the following equation (1):

$$\begin{cases} PE_{(pos,2i)} = \sin(pos/10000^{2i/d}) \\ PE_{(pos,2i+1)} = \cos(pos/10000^{2i/d}) \end{cases} \quad (1)$$

where pos is the degree of the node relative to the primary node, and i is the dimension of the element in the positional embedding vector. It can be understood that the value of each element of the positional embedding vector of the node is not limited to being computed by using equation (1). In one implementation, the positional embedding vector of each node can be obtained based on the relationship graphs using a p2v (position to vector) model. In one implementation, a positional embedding vector corresponding to each degree can be determined during pre-training of the embedding model, as will be described in detail below.

After a static embedding vector E_i (where i is A, B, . . . , and E, respectively) and a positional embedding vector E_j (where j is 0, 1, and 2, respectively) of a node are obtained, an input embedding vector $E_i$ of the node can be obtained based on the static embedding vector and the positional embedding vector. In an implementation, as shown in FIG. 3, the static embedding vector has the same dimension as the positional embedding vector, and the input embedding vector $E_i$ of the node can be set to be equal to the sum of the static embedding vector E_i and the positional embedding vector E_j of the node. It can be understood that the input embedding vector is not limited to the sum of the static embedding vector and the positional embedding vector, provided that information about the static embedding vector and the positional embedding vector is reflected in the input embedding vector. For example, the input embedding vector of the node can be set to be equal to a concatenation of the static embedding vector and the positional embedding vector of the node.

At S206, the respective input embedding vectors of the first node and the N neighboring nodes of the first node are input into the pre-trained embedding model, so the model outputs the respective dynamic embedding vectors of the first node and the multiple neighboring nodes of the first node in a case that the first node is a primary node, where the embedding model includes one or more computing blocks that are sequentially connected, each computing block includes a self-attention layer, and the self-attention layer outputs, relative to N+1 input vectors based on the self-attention mechanism, N+1 output vectors corresponding to the N+1 input vectors.

Figure 5:
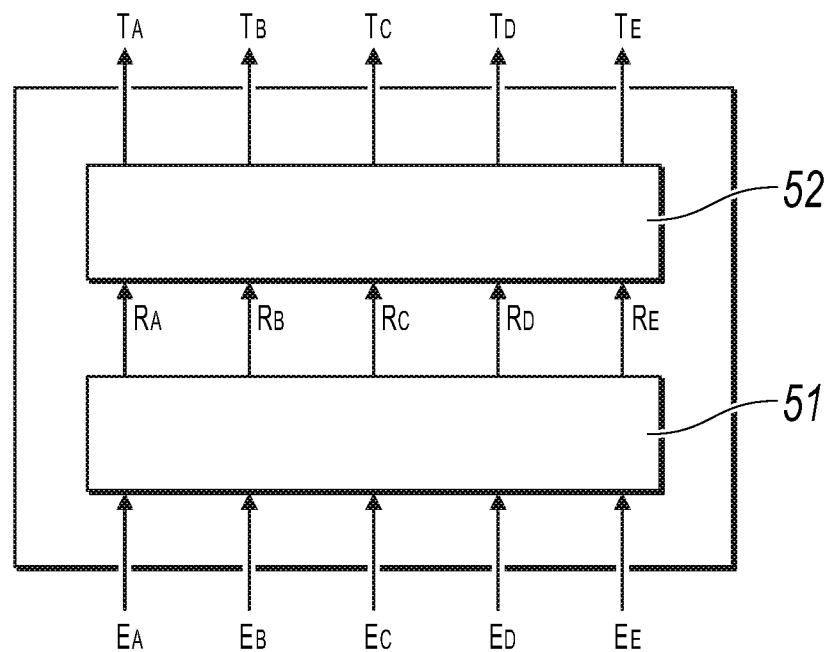
FIG. 5 is a schematic structural diagram illustrating an embedding model, according to an implementation of the present specification.

FIG. 5 is a schematic structural diagram illustrating an embedding model, according to an implementation of the present specification. As shown in the figure, the embedding model includes two computing blocks 51 and 52 that are sequentially connected. The computing block 51 outputs, to the computing block 52 based on the five input embedding vectors $E_i$ shown in FIG. 4, five intermediate vectors $R_i$ respectively corresponding to the five input embedding vectors, and the computing block 52 outputs, based on the input five intermediate vectors $R_i$, five dynamic embedding vectors $T_i$ respectively corresponding to the five intermediate vectors. It can be understood that the two computing blocks and five input embedding vectors shown in FIG. 5 are merely used as examples for description. In practice, the embedding model can include one or more computing blocks, that is, can include one computing block, or can include at least two computing blocks that are sequentially connected, and it can be predetermined that a predetermined number of input embedding vectors are input.

Figure 6:
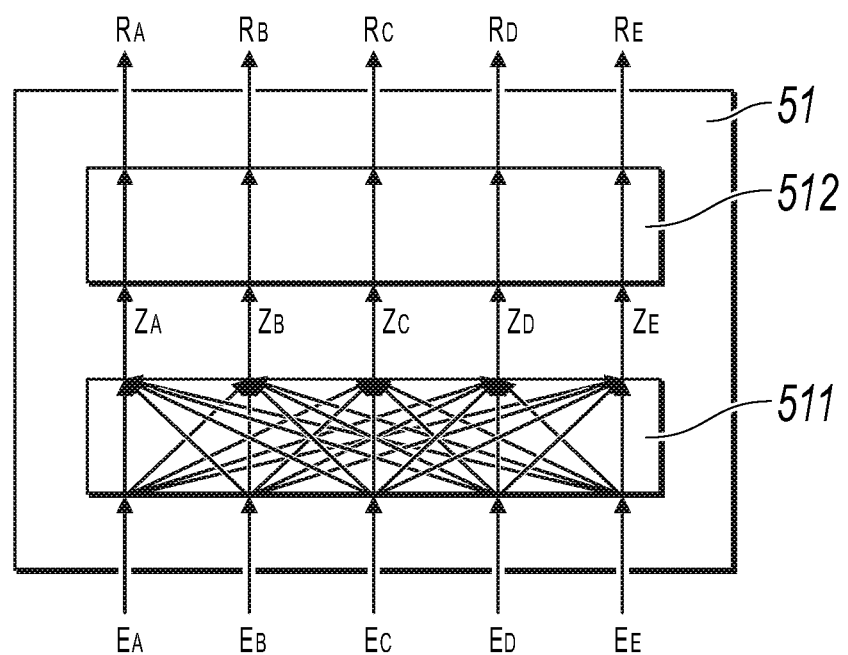
FIG. 6 is a schematic diagram illustrating an internal structure of a computing block.

FIG. 6 is a schematic diagram illustrating an internal structure of the computing block 51. The computing block can be constructed with reference to an encoder in a transformer model in the existing technology. As shown in FIG. 6, the computing block 51 can include a self-attention layer 511 and a feedforward layer 512. The self-attention layer 511 outputs, relative to the five input vectors in the figure based on self-attention mechanism, five output vectors $Z_i$ respectively corresponding to the five input vectors. As can be seen from the figure, each output vector $Z_i$ is computed based on all input vectors, where the computing is based on an attention function. Here, the computing block 51 is the first computing block of the embedding model. Therefore, an input vector of the self-attention layer of the computing block 51 is an input vector of the embedding model, that is, the input embedding vector E. It can be understood that, for a computing block subsequent to the first computing block, an input vector of a self-attention layer of the computing block is an output vector of a previous computing block. For example, as shown in FIG. 5, an input vector of a self-attention layer of the computing block 52 is the output vector $R_i$ of the computing block 51.

The following describes in detail a computing process based on the self-attention mechanism in the self-attention layer of the implementation of the present specification. For the so-called self-attention mechanism, references can be made to FIG. 6. That is, for each unit (for example, a node) in a sequence including multiple units, an attention value of the unit is obtained based on an attention value of the unit relative to each of other units in the sequence by using an attention function. The attention function is, for example, an attention function used in the transformer model in the existing technology. It can be understood that, this implementation of the present specification is not limited to using the attention function, and various attention functions, such as an additive attention function and a dot product attention function, that can be obtained in the existing technology can be used.

Figure 7:
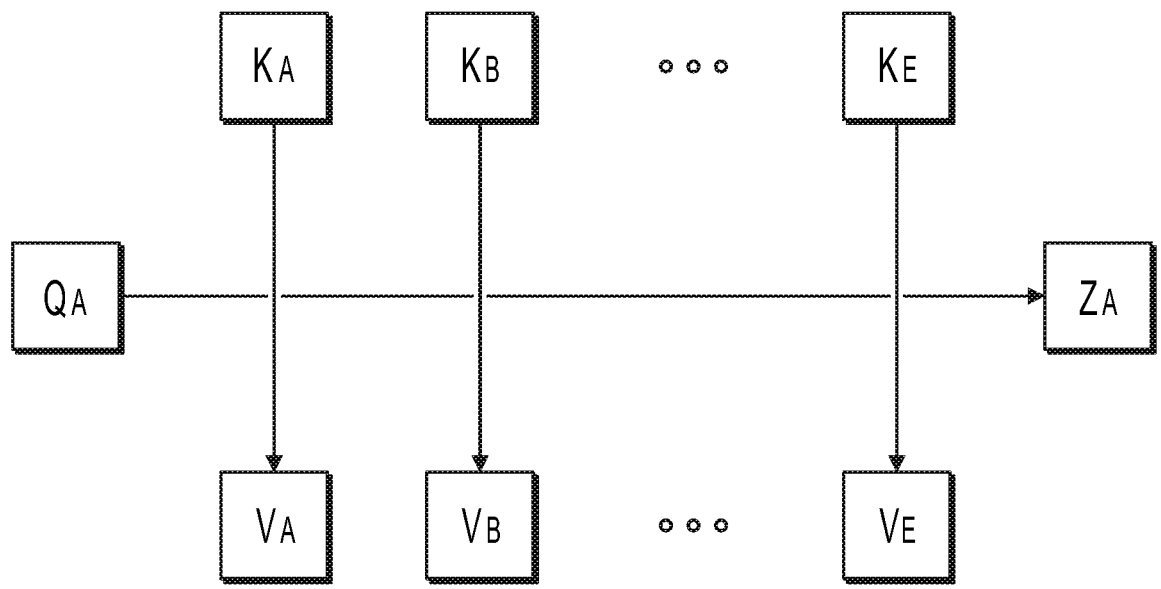
FIG. 7 is a schematic diagram illustrating a process of computing an attention value by using an attention function.

The essence of the attention function can be described as a mapping from a query to a series of (key-value) pairs, and FIG. 7 is a schematic diagram illustrating a process of computing an attention value by using an attention function. For example, for the input embedding vectors $E_A$-$E_E$ of nodes A-E obtained in FIG. 4, when the input embedding vectors are input into the embedding model shown in FIG. 5, the computing block 51 in FIG. 5 first performs self-attention computing on the five embedding vectors Ei. Specifically, first Q matrix $W_Q$, K matrix $W_K$, and V matrix $W_V$ that are determined during model pre-training are used to transform each input embedding vectors $E_i$, so as to obtain Q vector (query vector), K vector (key vector), and V vector (value vector) of each node that have the same dimension d. For example, for the input embedding vector $E_A$, Q vector $Q_A$, K vector $K_A$, and V vector $V_A$ of node A can be separately obtained by using the following equation (2):

$$\begin{cases} Q_A = E_A \times W_Q \\ K_A = E_A \times W_K \\ V_A = E_A \times W_V \end{cases} \quad (2)$$

Similarly, the other input embedding vectors can be transformed by using Q matrix $W_Q$, K matrix $W_K$, and V matrix $W_V$, so as to obtain Q vectors $Q_B$-$Q_E$, K vectors $K_B$-$K_E$, and V vectors $V_B$-$V_E$ of nodes B-E, respectively. Therefore, as shown in FIG. 7, for node A, a key-value pair (that is, a K vector and V vector pair) between Q vector $Q_A$ of node A and each node is computed based on the following equation (3), so as to obtain an attention value $Z_A$ of node A:

$$Z_A = \Sigma_{i=A,B,\ldots,E} \text{similarity}(Q_A, K_i) * V_i \quad (3)$$

The similarity measures function can use various functions available in the art, such as dot product, concatenation, and perceptron learning algorithm. It can be understood that in equation (3), the similarity measures between Q vector $Q_A$ of node A and K vector $K_i$ of each node are also an association degree between the input embedding vector of node A and the input embedding vector of each node. However, the association degree between the input embedding vector of node A and the input embedding vector of each node is not limited to being computed in this way. For example, the association degree between the input embedding vector of node A and the input embedding vector of each node can be directly the similarity measures between the input embedding vector of node A and the input embedding vector of each node. That is, in equation (3), a weight of each V vector is not limited to the previous similarity measures, provided that the weight represents the association degree between the input embedding vector of node A and the input embedding vector of each node.

In an implementation, the attention value ZA can be computed as shown in equation (4):

$$Z_A = \Sigma_{i=A,B,\ldots,E} \text{softmax}\left(\frac{Q_A \cdot K_i}{\sqrt{d}}\right) * V_i \quad (4)$$

$\sqrt{d}$ is used to make the gradient more stable during model training, and the softmax function is used for normalization. In the previous self-attention mechanism, a group of Q-matrices, K-matrices, and V-matrices are used to obtain attention values $Z_i$ of all nodes. In an implementation, a multi-head self-attention mechanism can be used in a computing block. That is, for example, similar to the previous description, attention values $Z_{A1}$, $Z_{A2}$, and $Z_{A3}$ of node A are separately obtained by using multiple groups of Q-matrices, K-matrices, and V-matrices, and then a concatenated vector ($Z_{A1}$, $Z_{A2}$, and $Z_{A3}$) is linearly transformed by using an O-matrix WO determined through pre-training, so as to obtain a multi-head attention value $Z_A$ of node A.

As shown in FIG. 6, the computing block further includes a feedforward layer 512. The feedforward layer 512 is, for example, a fully connected layer, and separately computes attention values $Z_A$-$Z_E$ output from the self-attention layer 511, so as to separately obtain corresponding output vectors $R_A$-$R_E$ of the computing block 51, and input the vectors $R_A$-$R_E$ as input vectors corresponding to each node into the computing block 52, so as to perform a computing process similar to that in the computing block 51. As shown in the figure, for example, in the feedforward layer 512, the output vector $R_A$ output from the layer 512 is computed based only on the corresponding input vector $Z_A$ of the layer. It can be understood that, in this implementation of the present specification, the feedforward layer correspondingly changes with a specific application scenario, and the feedforward layer is not mandatory. Similarly, the computing block 52 in FIG. 5 outputs, based on its input vectors $R_A$-$R_E$, dynamic embedding vectors $T_A$-$T_E$ corresponding to each node. Based on the previous computing process, it can be understood that, according to this implementation of the present specification, dynamic embedding vectors $T_A$-$T_E$ of each node output by the embedding model reflect impact of other nodes on the node, and the dynamic embedding vectors $T_A$-$T_E$ dynamically change with different primary nodes selected in a group of node sequences.

Figure 8:
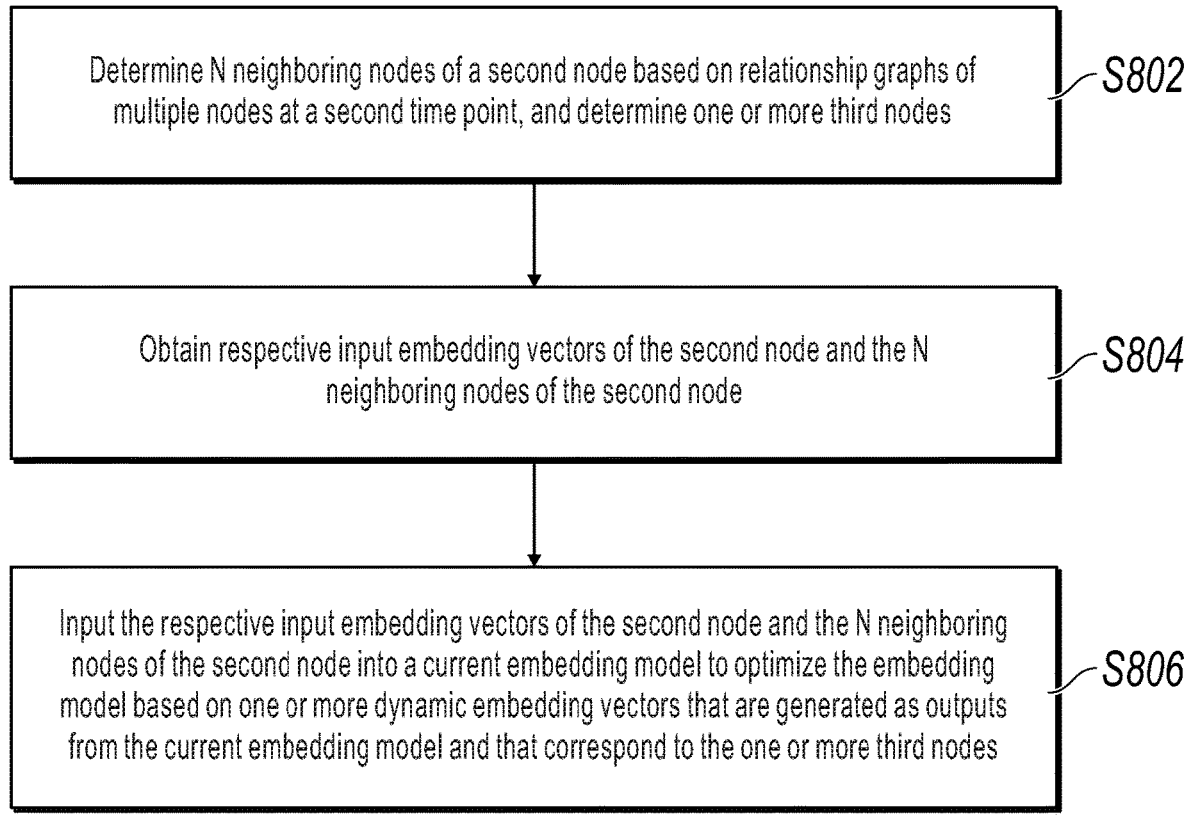
FIG. 8 illustrates a method for pre-training the previous embedding model, according to an implementation of the present specification.

FIG. 8 illustrates a method for pre-training the previous embedding model, according to an implementation of the present specification. The multiple nodes include a second node, and the method includes:

S802. Determine N neighboring nodes of the second node based on relationship graphs of the multiple nodes at a second time point, and determine one or more third nodes, where the third node is a node selected from the second node and the N neighboring nodes of the second node, and the second time point is a time point before the first time point.

S804. Obtain respective input embedding vectors of the second node and the N neighboring nodes of the second node, where an input embedding vector of the third node is a predetermined vector unrelated to the third node, and respective input embedding vectors of the second node and the N neighboring nodes of the second node except the one or more third nodes are determined based on a static embedding vector and a positional embedding vector of the node.

S806. Input the respective input embedding vectors of the second node and the N neighboring nodes of the second node into a current embedding model to optimize the embedding model based on one or more dynamic embedding vectors that are generated as outputs from the current embedding model and that correspond to the one or more third nodes.

The pre-training is performed by using previous dynamic relationship graphs of multiple nodes in predetermined duration as training data, so the embedding model is not only corresponding to relationship graphs of the multiple nodes at one time point, but also corresponding to relationship graphs of the multiple nodes at multiple time points, thereby better depicting impact between the multiple nodes. The method shown in FIG. 8 corresponds to one time of training in pre-training. For different relationship graphs of multiple nodes at multiple time points, multiple times of training can be performed on the diagram at each time point. That is, different times of training can be corresponding to one time point, or can be corresponding to different time points. Or one time of training can be performed on the diagram at each time point, that is, different times of training are corresponding to different time points. In the method shown in FIG. 8, similar to the Bert model in the existing technology, training data can be obtained by masking one or more nodes in a sequence. It can be understood that a training method for the embedding model is not limited to the previous method, but can be any method that can be obtained by a person skilled in the art. For example, model training can be performed by using a dynamic embedding vector difference between similar nodes as a loss function.

The following specifically describes steps in the method.

First, at S802, N neighboring nodes of the second node are determined based on the relationship graphs of the multiple nodes at the second time point, and one or more third nodes are determined, where the third node is a node selected from the second node and the N neighboring nodes of the second node, and the second time point is a time point before the first time point.

The second time point is any time point in the predetermined duration used for pre-training. Generally, the second time point is a time point before the first time point, that is, usually the model is used after the embedding model is pre-trained.

In this step, similar to step S202 in FIG. 2, the second node is used as a primary node, and N neighboring nodes of the second node are obtained. For example, the second node can be any node in FIG. 3. For specific descriptions of the N neighboring nodes, references can be made to the previous description in step S202. Details are omitted here. In the second node and the N neighboring nodes of the second node, one or more nodes can be specified in advance as the one or more third nodes, or one or more nodes can be randomly determined as the one or more third nodes. For example, the relationship graphs in FIG. 3 is used as an example. The third node can be determined as any one of node A to node E, and the number of third nodes can be one or more. Generally, the number of third nodes can be determined by using a specific proportion of the multiple nodes, or by using a specific proportion of N+1, etc.

At S804, the respective input embedding vectors of the second node and the N neighboring nodes of the second node are obtained, where the input embedding vector of the third node is a predetermined vector unrelated to the third node, and the respective input embedding vectors of the second node and the N neighboring nodes of the second node except the one or more third nodes are determined based on the static embedding vector and the positional embedding vector of the node.

The third node is also a masking node, that is, when the input embedding vector of each node is input into the embedding model, the input embedding vector of the third node does not correspond to attribute positional features of the third node, but is replaced with a vector unrelated to the third node, thereby achieving a masking effect. Specifically, for example, the input embedding vector of the third node can be determined by using a static embedding vector and a randomly determined positional embedding vector of another node in randomly determined relationship graphs, or a pre-specified vector is used as the input embedding vector of the third node. Description of the obtaining of the respective input embedding vectors of the second node and the N neighboring nodes of the second node except the one or more third nodes is the same as the previous description in step S204. Details are omitted here.

At S806, the respective input embedding vectors of the second node and the N neighboring nodes of the second node are input into the current embedding model to optimize the embedding model based on one or more dynamic embedding vectors that are generated as outputs from the current embedding model and that correspond to the one or more third nodes.

Based on structural features of the embedding model, the dynamic embedding vector of each node output by the embedding model includes not only feature information of the node, but also includes impact of other nodes on the node. Therefore, even in the case of masking the input embedding vector corresponding to the node, the embedding model can still predict the dynamic embedding vector of the node based on input embedding vectors of other nodes in the node sequence input into the model. Therefore, model training can be performed based on a dynamic embedding vector corresponding to each masking node (that is, the third node) that is output by the model. For example, the dynamic embedding vector of the third node can be input into a specific downstream model, such as a model for predicting a node identity, and the embedding model can be trained, for example, by using a back propagation algorithm based on a prediction error.

As described above, during the training of the embedding model, in addition to each weight matrix in the model, the static embedding vector of each node and a positional embedding vector corresponding to each degree can be trained. For example, for the relationship graphs shown in FIG. 3, during initial training, static embedding vectors $E_A$-$E_E$ of each node and positional embedding vectors $E_0$-$E_2$ that are respectively corresponding to three degrees can be randomly determined. During training of the model, in each time of training, static embedding vectors and positional embedding vectors of each node that are input in this time of training are static embedding vectors and positional embedding vectors that are optimized in a previous time of training. The static embedding vectors and the positional embedding vectors that are input in this time of training can be adjusted, for example, by using a gradient descent method, so the static embedding vectors and the positional embedding vectors include information in relationship graphs at multiple time points.

Figure 9:
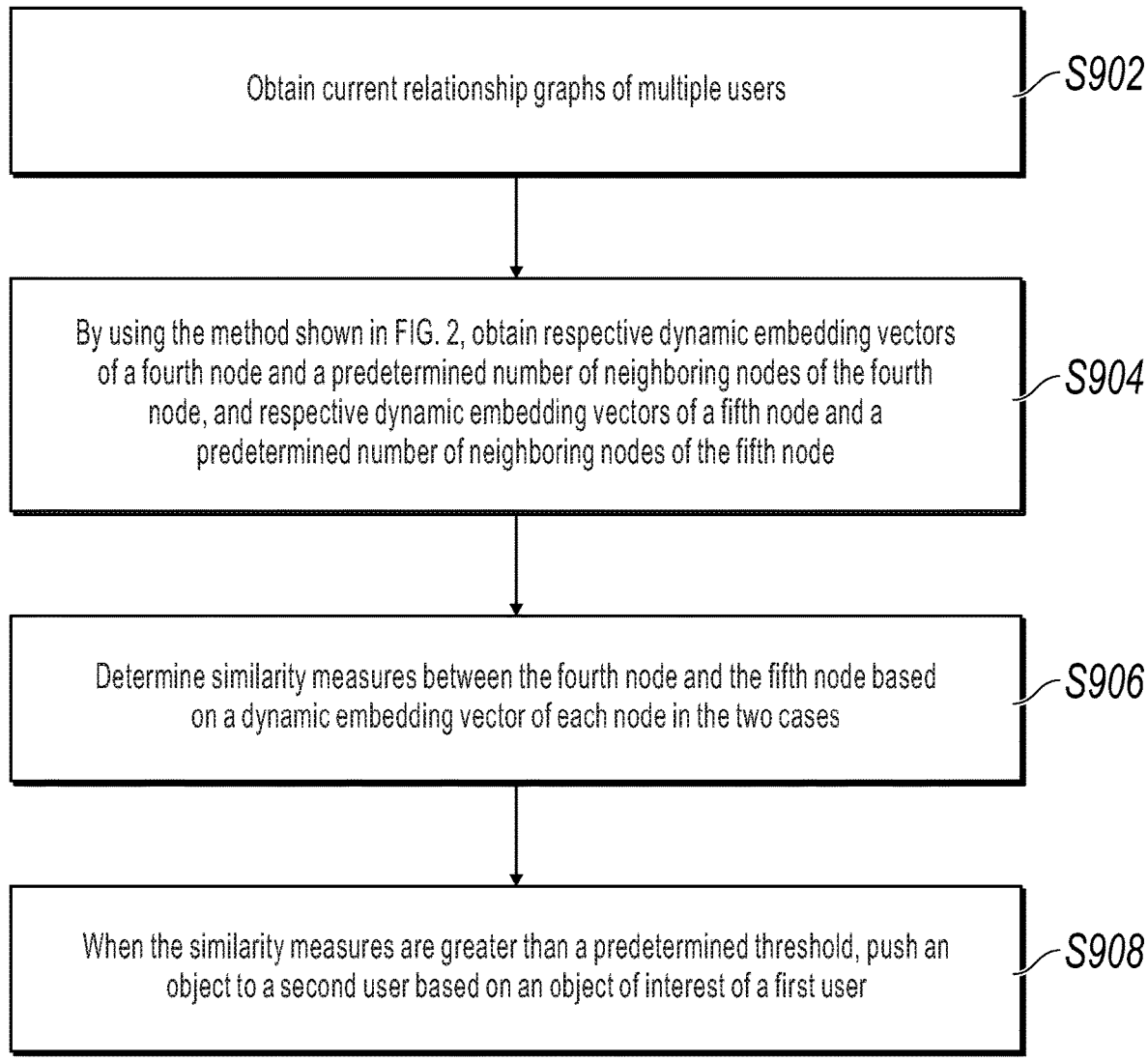
FIG. 9 illustrates a method for pushing an object to a user, according to an implementation of the present specification.

FIG. 9 illustrates a method for pushing an object to a user, according to an implementation of the present specification, including:

S902. Obtain current relationship graphs of multiple users, where the multiple users include a first user and a second user, which are respectively corresponding to a fourth node and a fifth node in the current relationship graphs.

S904. Based on the current relationship graphs and by using the method in FIG. 2, separately obtain respective dynamic embedding vectors of the fourth node and a predetermined number of neighboring nodes of the fourth node in a case that the fourth node is a primary node, and respective dynamic embedding vectors of the fifth node and a predetermined number of neighboring nodes of the fifth node in a case that the fifth node is a primary node.

S906. Determine the similarity measures between the fourth node and the fifth node based on the dynamic embedding vector of each node in the two cases.

S908. When the similarity measures are greater than a predetermined threshold, push an object to the second user based on an object of interest of the first user.

The method shown in FIG. 9 is a downstream application of the output of the embedding model according to the implementation of the present specification. It can be understood that the downstream application of the output of the embedding model is not limited to the method, but can include downstream applications of various other scenarios. For example, a forging user in users is explored by using a dynamic embedding vector of a node.

At S902, the current relationship graphs of the multiple users are obtained, where the multiple users include the first user and the second user, which are respectively corresponding to the fourth node and the fifth node in the current relationship graphs. The first user is, for example, a user randomly determined in the relationship graphs, or can be a typical user (for example, a user who purchases a particular product), and the second user is, for example, a user to whom the product is to be pushed.

For step S904, references can be made to the previous specific description of FIG. 2. Details are omitted here.

At S906, the similarity measures between the fourth node and the fifth node are determined based on the dynamic embedding vector of each node in the two cases.

The similarity measures between the fourth node and the fifth node can be determined by multiple methods. In an implementation, the similarity measures between the fourth node and the fifth node can be computed based on similarity measures between a first dynamic embedding vector and a second dynamic embedding vector, where the first dynamic embedding vector is a dynamic embedding vector of the fourth node in a case that the fourth node is a primary node, and the second dynamic embedding vector is a dynamic embedding vector of the fifth node in a case that the fifth node is a primary node. In an implementation, the first dynamic embedding vector and the second dynamic embedding vector can be input into a predetermined model separately or simultaneously, to determine the similarity measures between the fourth node and the fifth node. In this case, the predetermined model can be trained for a specific feature to determine the similarity measures between the fourth node and the fifth node relative to the specific feature. For example, the predetermined model can be trained for a specific product, so the similarity measures between the first user and the second user for the specific product can be determined. Therefore, when the first user purchases the product, the product can be recommended to the second user.

In one implementation, the overall similarity measures between multiple dynamic embedding vectors output by the model in the case that the fourth node is a primary node and multiple dynamic embedding vectors output by the model in the case that the fifth node is a primary node can be computed as the similarity measures between the fourth node and the fifth node.

At S908, when the similarity measures are greater than the predetermined threshold, an object is pushed to the second user based on the object of interest of the first user.

The object of interest of the first user can be multiple objects, such as a purchased product, a rated movie, a favorite store, etc. Therefore, when the similarity measures are greater than the predetermined threshold, information can be pushed to the second user based on the object of interest of the first user.

Figure 10:
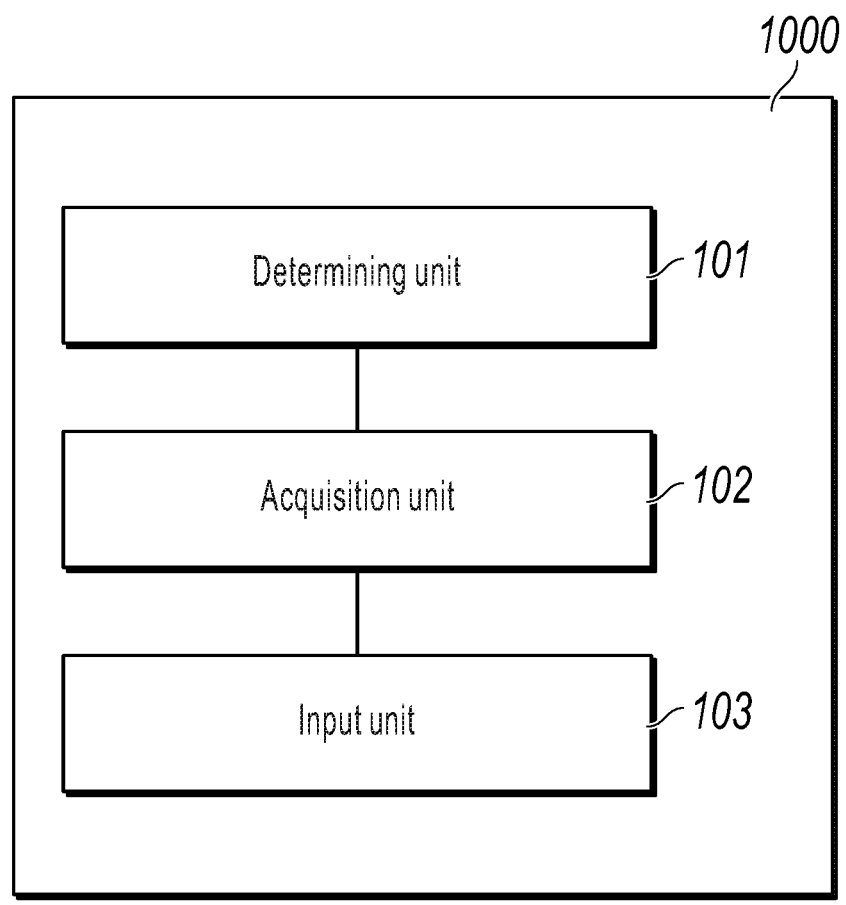
FIG. 10 illustrates a device 1000 for obtaining a dynamic embedding vector of a node in relationship graphs of multiple nodes, according to an implementation of the present specification.

FIG. 10 illustrates a device 1000 for obtaining a dynamic embedding vector of a node in relationship graphs of multiple nodes, according to an implementation of the present specification. The multiple nodes include a first node, and the device includes: a determining unit 101, configured to determine N neighboring nodes of the first node based on relationship graphs of the multiple nodes at a first time point, where N is a predetermined integer; an acquisition unit 102, configured to obtain respective input embedding vectors of the first node and the N neighboring nodes of the first node, where the input embedding vector of each node is determined based on a static embedding vector and a positional embedding vector of the node, the static embedding vector corresponds to attribute features of the node, and the positional embedding vector corresponds to positional features of the node relative to the first node; and an input unit 103, configured to input the respective input embedding vectors of the first node and the N neighboring nodes of the first node into a pre-trained embedding model, so the model outputs respective dynamic embedding vectors of the first node and the multiple neighboring nodes of the first node in a case that the first node is a primary node, where the embedding model includes one or more or more computing blocks that are sequentially connected, each computing block includes a corresponding self-attention layer, and the self-attention layer outputs, relative to N+1 input vectors based on self-attention mechanism, N+1 output vectors corresponding to the N+1 input vectors.

Figure 11:
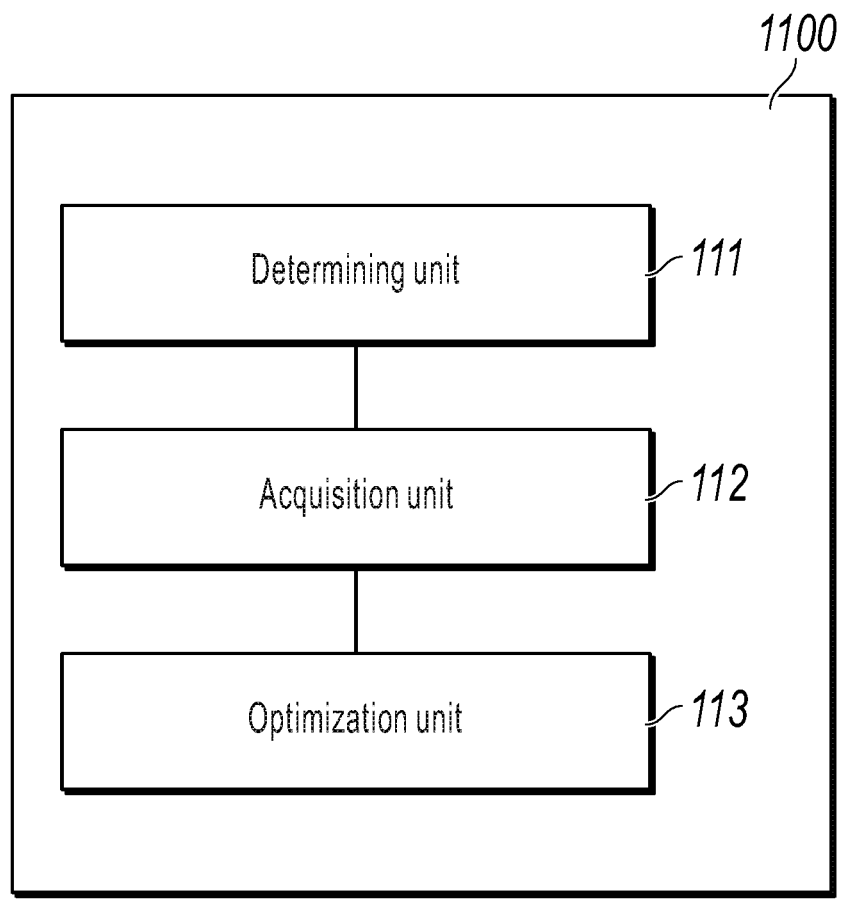
FIG. 11 illustrates a training device 1100 for pre-training an embedding model, according to an implementation of the present specification.

FIG. 11 illustrates a training device 1100 for pre-training an embedding model, according to an implementation of the present specification. The training device includes: a determining unit 111, configured to determine N neighboring nodes of a second node based on relationship graphs of multiple nodes at a second time point, and determine one or more third nodes, where the third node is a node selected from the second node and the N neighboring nodes of the second node, and the second time point is a time point before a first time point; an acquisition unit 112, configured to obtain respective input embedding vectors of the second node and the N neighboring nodes of the second node, where an input embedding vector of the third node is a predetermined vector unrelated to the third node, and respective input embedding vectors of the second node and the N neighboring nodes of the second node except the one or more third nodes are determined based on a static embedding vector and a positional embedding vector of the node; and an optimization unit 113, configured to input the respective input embedding vectors of the second node and the N neighboring nodes of the second node into a current embedding model to optimize the embedding model based on one or more dynamic embedding vectors that are generated as outputs from the current embedding model and that correspond to the one or more third nodes.

In an implementation, the optimization unit 113 is further configured to optimize parameters of the embedding model and optimize input embedding vectors and positional embedding vectors of the second node and the N neighboring nodes of the second node except the one or more third nodes.

Figure 12:
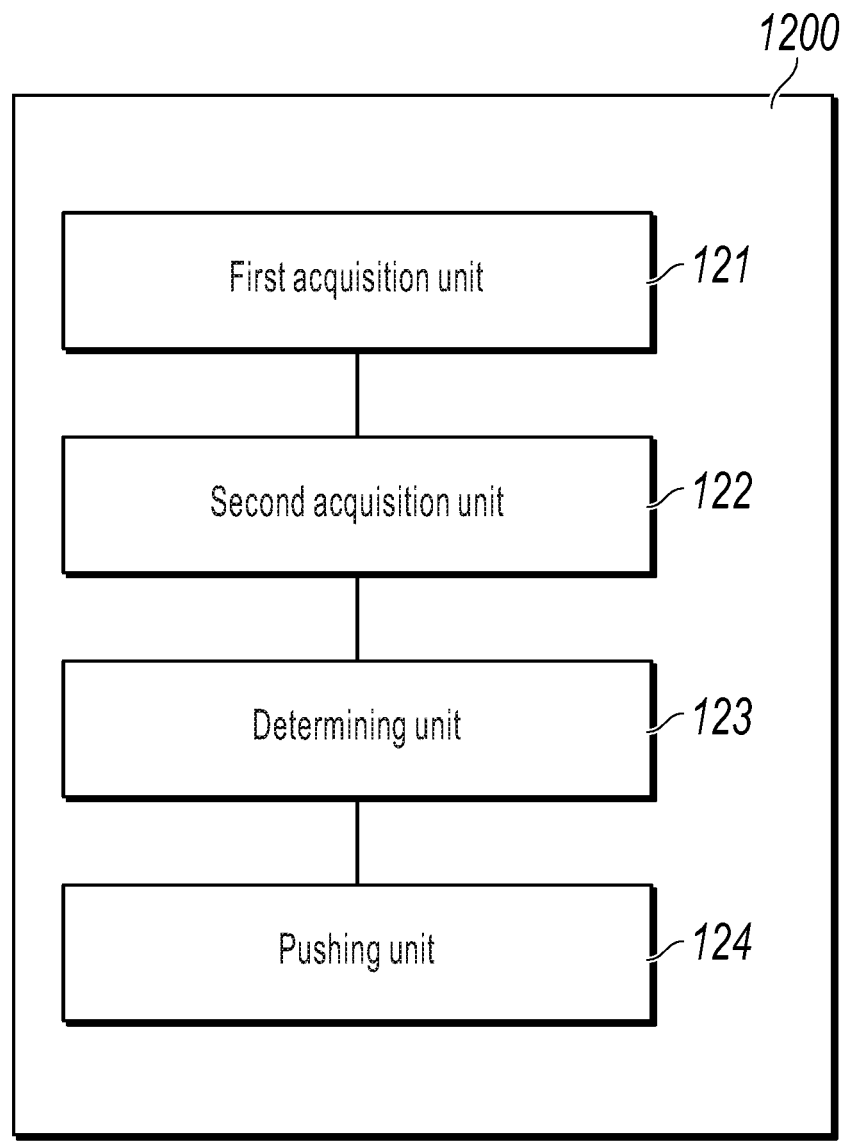
FIG. 12 illustrates a device 1200 for pushing an object to a user, according to an implementation of the present specification.

FIG. 12 illustrates a device 1200 for pushing an object to a user, according to an implementation of the present specification, including: a first acquisition unit 121, configured to obtain current relationship graphs of multiple users, where the multiple users include a first user and a second user, which are respectively corresponding to a fourth node and a fifth node in the current relationship graphs; a second acquisition unit 122, configured to: based on the current relationship graphs and by using the device for obtaining dynamic embedding vectors, separately obtain respective dynamic embedding vectors of the fourth node and a predetermined number of neighboring nodes of the fourth node in a case that the fourth node is a primary node, and respective dynamic embedding vectors of the fifth node and a predetermined number of neighboring nodes of the fifth node in a case that the fifth node is a primary node; a determining unit 123, configured to determine similarity measures between the fourth node and the fifth node based on a dynamic embedding vector of each node in the two cases; and a pushing unit 124, configured to: when the similarity measures are greater than a predetermined threshold, push an object to the second user based on an object of interest of the first user.

In an implementation, the determining unit 123 is further configured to compute the similarity measures between the fourth node and the fifth node based on similarity measures between a first dynamic embedding vector and a second dynamic embedding vector, where the first dynamic embedding vector is a dynamic embedding vector of the fourth node in a case that the fourth node is a primary node, and the second dynamic embedding vector is a dynamic embedding vector of the fifth node in a case that the fifth node is a primary node.

Another aspect of the present specification provides a computer readable storage medium that stores a computer program, and when the computer program is executed on a computer, the computer is caused to perform the method according to any one of the previous aspects.

Another aspect of the present specification provides a computing device, including a memory and a processor. Executable code is stored in the memory, and when executing the executable code, the processor implements the method according to any one of the previous aspects.

According to the graph node embedding solution of the implementations of the present specification, the embedding model is trained based on dynamically changed relationship graphs among multiple nodes in a period of time. In the embedding model, a dynamic embedding vector of each node is obtained in a certain context (i.e., a specific node is used as a primary node) based on self-attention mechanism, so more information is reflected in the dynamic embedding vector of each node, such as context (neighbor and position) information of a node, dynamically changed connection information between nodes, etc., thereby effectively utilizing temporal network structure information.

It should be understood that descriptions such as "first" and "second" in the present specification are merely intended to distinguish between similar concepts for simplicity of description, and do not impose a limitation.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

A person of ordinary skill in the art can be further aware that, in combination with the examples described in the implementations disclosed in the present specification, units and algorithm steps can be implemented by electronic hardware, computer software, or a combination thereof. To clearly describe interchangeability between the hardware and the software, compositions and steps of each example are generally described above based on functions. Whether the functions are performed by hardware or software depends on particular applications and design constraint conditions of the technical solutions. A person of ordinary skill in the art can use different methods to implement the described functions for each particular application, but it should not be considered that the implementation goes beyond the scope of the present application.

Steps of methods or algorithms described in the implementations disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and benefits of the present disclosure are further described in detail. It should be understood that the descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A computer-implemented method, comprising:
   determining, by a computing device, N neighboring nodes of a first node of a plurality of nodes, based on relationship graphs of the plurality of nodes at a first time point, wherein N is a predetermined integer;
   obtaining, by the computing device, respective input embedding vectors of the first node and the N neighboring nodes of the first node, wherein the input embedding vector of each node is determined based on a respective static embedding vector and a respective positional embedding vector of the node, wherein the static embedding vector (i) is fixed relative to the relationship graphs at the first time point and corresponds to static attribute features of the node, and (ii) is obtained based on an adjacency matrix of the relationship graphs of the plurality of nodes at the first time point, and the positional embedding vector corresponds to positional features of the node relative to the first node;
   inputting, by the computing device, the respective input embedding vectors of the first node and the N neighboring nodes of the first node into a pre-trained embedding model, wherein the pre-trained embedding model comprises one or more computing blocks that are sequentially connected, each computing block comprising a corresponding self-attention layer that computes and outputs N+1 output vectors corresponding to N+1 input vectors, based on performing one or more self-attention functions; and
   receiving, by the computing device, respective dynamic embedding vectors of the first node and the N neighboring nodes of the first node that have been output by the pre-trained embedding model.

2. The computer-implemented method of claim 1, wherein the N neighboring nodes of the first node are neighboring nodes within a predetermined degree.

3. The computer-implemented method of claim 1, wherein the static embedding vector and the positional embedding vector are obtained during pre-training of the embedding model.

4. The computer-implemented method of claim 1, wherein for each node of the plurality of nodes, respective values of elements of the positional embedding vector are obtained based on a degree of the node relative to the first node and a dimension of an element in the positional embedding vector.

5. The computer-implemented method of claim 1, wherein the self-attention layer of each computing block performs one or more self-attention functions, and each self-attention function outputs, based on N+1 input vectors input into the self-attention layer, N+1 function output vectors respectively corresponding to the N+1 input vectors, wherein an ith function output vector of the N+1 function output vectors is a weighted combination of respective first transform vectors of the N+1 input vectors, using an association degree between an ith input vector of the N+1 input vectors and each input vector of the N+1 input vectors as a weight, wherein each first transform vector is obtained by transforming a corresponding input vector of the N+1 input vectors by using a first weight matrix corresponding to the self-attention function, the first weight matrix being obtained by pre-training the embedding model.

6. The computer-implemented method of claim 5, wherein each input vector further comprises a jth input vector, wherein an association degree between the ith input vector and the jth input vector is based on similarity measures between a second transform vector of the ith input vector and a third transform vector of the jth input vector, the second transform vector being obtained by transforming a corresponding input vector by using a second weight matrix corresponding to the self-attention function, the third transform vector being obtained by transforming a corresponding input vector by using a third weight matrix corresponding to the self-attention function, with both the second weight matrix and the third weight matrix being obtained by pre-training the embedding model.

7. The computer-implemented method of claim 1, wherein the plurality of nodes comprise a second node, and wherein the method further comprises pre-training the embedding model by performing operations comprising:
   determining N neighboring nodes of the second node based on relationship graphs of the plurality of nodes at a second time point, the second time point being before the first time point;
   determining one or more third nodes, wherein each third node of the one or more third nodes is selected from the second node and the N neighboring nodes of the second node;
   obtaining respective input embedding vectors of the second node and the N neighboring nodes of the second node, wherein an input embedding vector of the third node is a predetermined vector unrelated to the third node, and respective input embedding vectors of the second node and the N neighboring nodes of the second node except the one or more third nodes are determined based on a static embedding vector and a positional embedding vector of each node;
   inputting the respective input embedding vectors of the second node and the N neighboring nodes of the second node into a current embedding model; and
   optimizing the embedding model based on one or more dynamic embedding vectors that are generated as outputs from the current embedding model and that correspond to the one or more third nodes.

8. A non-transitory, computer-readable medium storing one or more instructions executable by a computer system to perform operations comprising:
   determining, by a computing device, N neighboring nodes of a first node of a plurality of nodes, based on relationship graphs of the plurality of nodes at a first time point, wherein N is a predetermined integer;
   obtaining, by the computing device, respective input embedding vectors of the first node and the N neighboring nodes of the first node, wherein the input embedding vector of each node is determined based on a respective static embedding vector and a respective positional embedding vector of the node, wherein the static embedding vector (i) is fixed relative to the relationship graphs at the first time point and corresponds to static attribute features of the node, and (ii) is obtained based on an adjacency matrix of the relationship graphs of the plurality of nodes at the first time point, and the positional embedding vector corresponds to positional features of the node relative to the first node;
   inputting, by the computing device, the respective input embedding vectors of the first node and the N neighboring nodes of the first node into a pre-trained embedding model, wherein the pre-trained embedding model comprises one or more computing blocks that are sequentially connected, each computing block comprising a corresponding self-attention layer that computes and outputs N+1 output vectors corresponding to N+1 input vectors, based on performing one or more self-attention functions; and
   receiving, by the computing device, respective dynamic embedding vectors of the first node and the N neighboring nodes of the first node that have been output by the pre-trained embedding model.

9. The computer-readable medium of claim 8, wherein for each node of the plurality of nodes, respective values of elements of the positional embedding vector are obtained based on a degree of the node relative to the first node and a dimension of an element in the positional embedding vector.

10. The computer-readable medium of claim 8, wherein the self-attention layer of each computing block performs one or more self-attention functions, and each self-attention function outputs, based on N+1 input vectors input into the self-attention layer, N+1 function output vectors respectively corresponding to the N+1 input vectors, wherein an ith function output vector of the N+1 function output vectors is a weighted combination of respective first transform vectors of the N+1 input vectors, using an association degree between an ith input vector of the N+1 input vectors and each input vector of the N+1 input vectors as a weight, wherein each first transform vector is obtained by transforming a corresponding input vector of the N+1 input vectors by using a first weight matrix corresponding to the self-attention function, the first weight matrix being obtained by pre-training the embedding model.

11. The computer-readable medium of claim 10, wherein each input vector further comprises a jth input vector, wherein an association degree between the ith input vector and the jth input vector is based on similarity measures between a second transform vector of the ith input vector and a third transform vector of the jth input vector, the second transform vector being obtained by transforming a corresponding input vector by using a second weight matrix corresponding to the self-attention function, the third transform vector being obtained by transforming a corresponding input vector by using a third weight matrix corresponding to the self-attention function, with both the second weight matrix and the third weight matrix being obtained by pre-training the embedding model.

12. The computer-readable medium of claim 8, wherein the plurality of nodes comprise a second node, and wherein the operations further comprise pre-training the embedding model by performing operations comprising:
   determining N neighboring nodes of the second node based on relationship graphs of the plurality of nodes at a second time point, the second time point being before the first time point;

determining one or more third nodes, wherein each third node of the one or more third nodes is selected from the second node and the N neighboring nodes of the second node;

obtaining respective input embedding vectors of the second node and the N neighboring nodes of the second node, wherein an input embedding vector of the third node is a predetermined vector unrelated to the third node, and respective input embedding vectors of the second node and the N neighboring nodes of the second node except the one or more third nodes are determined based on a static embedding vector and a positional embedding vector of each node;

inputting the respective input embedding vectors of the second node and the N neighboring nodes of the second node into a current embedding model; and optimizing the embedding model based on one or more dynamic embedding vectors that are generated as outputs from the current embedding model and that correspond to the one or more third nodes.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

determining, by a computing device, N neighboring nodes of a first node of a plurality of nodes, based on relationship graphs of the plurality of nodes at a first time point, wherein N is a predetermined integer;

obtaining, by the computing device, respective input embedding vectors of the first node and the N neighboring nodes of the first node, wherein the input embedding vector of each node is determined based on a respective static embedding vector and a respective positional embedding vector of the node, wherein the static embedding vector (i) is fixed relative to the relationship graphs at the first time point and corresponds to static attribute features of the node, and (ii) is obtained based on an adjacency matrix of the relationship graphs of the plurality of nodes at the first time point, and the positional embedding vector corresponds to positional features of the node relative to the first node;

inputting, by the computing device, the respective input embedding vectors of the first node and the N neighboring nodes of the first node into a pre-trained embedding model, wherein the pre-trained embedding model comprises one or more computing blocks that are sequentially connected, each computing block comprising a corresponding self-attention layer that computes and outputs N+1 output vectors corresponding to N+1 input vectors, based on performing one or more self-attention functions; and receiving, by the computing device, respective dynamic embedding vectors of the first node and the N neighboring nodes of the first node that have been output by the pre-trained embedding model.

14. The computer-implemented system of claim 13 wherein for each node of the plurality of nodes, respective values of elements of the positional embedding vector are obtained based on a degree of the node relative to the first node and a dimension of an element in the positional embedding vector.

15. The computer-implemented system of claim 13, wherein the self-attention layer of each computing block performs one or more self-attention functions, and each self-attention function outputs, based on N+1 input vectors input into the self-attention layer, N+1 function output vectors respectively corresponding to the N+1 input vectors, wherein an ith function output vector of the N+1 function output vectors is a weighted combination of respective first transform vectors of the N+1 input vectors, using an association degree between an ith input vector of the N+1 input vectors and each input vector of the N+1 input vectors as a weight, wherein each first transform vector is obtained by transforming a corresponding input vector of the N+1 input vectors by using a first weight matrix corresponding to the self-attention function, the first weight matrix being obtained by pre-training the embedding model.

16. The computer-implemented system of claim 15, wherein each input vector further comprises a jth input vector, wherein an association degree between the ith input vector and the jth input vector is based on similarity measures between a second transform vector of the ith input vector and a third transform vector of the jth input vector, the second transform vector being obtained by transforming a corresponding input vector by using a second weight matrix corresponding to the self-attention function, the third transform vector being obtained by transforming a corresponding input vector by using a third weight matrix corresponding to the self-attention function, with both the second weight matrix and the third weight matrix being obtained by pre-training the embedding model.

17. The computer-implemented system of claim 13, wherein the plurality of nodes comprise a second node, and wherein the operations further comprise pre-training the embedding model by performing operations comprising:

determining N neighboring nodes of the second node based on relationship graphs of the plurality of nodes at a second time point, the second time point being before the first time point;

determining one or more third nodes, wherein each third node of the one or more third nodes is selected from the second node and the N neighboring nodes of the second node;

obtaining respective input embedding vectors of the second node and the N neighboring nodes of the second node, wherein an input embedding vector of the third node is a predetermined vector unrelated to the third node, and respective input embedding vectors of the second node and the N neighboring nodes of the second node except the one or more third nodes are determined based on a static embedding vector and a positional embedding vector of each node;

inputting the respective input embedding vectors of the second node and the N neighboring nodes of the second node into a current embedding model; and optimizing the embedding model based on one or more dynamic embedding vectors that are generated as outputs from the current embedding model and that correspond to the one or more third nodes.

* * * * *